(12) United States Patent
Pu et al.

(10) Patent No.: US 9,859,929 B2
(45) Date of Patent: Jan. 2, 2018

(54) NOISE VARIANCE ESTIMATION CIRCUIT AND METHOD FOR WIRELESS COMMUNICATION

(71) Applicant: REALTEK SEMICONDUCTOR CORPORATION, Hsinchu (TW)

(72) Inventors: Jyun-Wei Pu, Taipei (TW); Chung-Yao Chang, Hsinchu County (TW)

(73) Assignee: REALTEK SEMICONDUCTOR CORPORATION, Hsinchu (TW)

( * ) Notice: Subject to any disclaimer, the term of this patent is extended or adjusted under 35 U.S.C. 154(b) by 0 days.

(21) Appl. No.: 15/361,339

(22) Filed: Nov. 25, 2016

(65) Prior Publication Data

US 2017/0207804 A1 Jul. 20, 2017

(30) Foreign Application Priority Data

Jan. 19, 2016 (TW) .............................. 105101528 A

(51) Int. Cl.
*H04B 1/10* (2006.01)

(52) U.S. Cl.
CPC .................................. *H04B 1/1036* (2013.01)

(58) Field of Classification Search
CPC . H04L 5/0048; H04L 25/022; H04L 25/0228; H04L 27/2647; H04L 25/0232; H04L 1/0026; H04L 1/0029; H04L 2025/03808; H04L 25/03343; H04L 5/0023; H04L 5/0057; H04L 5/0091; H04L 1/0036; H04L 1/0051; H04L 1/0054; H04L 25/0204

USPC .......................................................... 455/307
See application file for complete search history.

(56) References Cited

U.S. PATENT DOCUMENTS 7,526,041 B2 * 4/2009 Kakura ............... H04L 25/0224
375/147
8,379,773 B2 2/2013 Krasny et al.
8,787,473 B2 7/2014 Zhang
(Continued)

OTHER PUBLICATIONS

Leonardo Rey Vega et al., Wiener filtering, A rapid introduction to adaptive filtering, SpringerBriefs in Electrical and Computer Engineering, 2013, p. 7-17.

*Primary Examiner* — Ajibola Akinyemi
(74) *Attorney, Agent, or Firm* — WPAT, P.C., Intellectual Property Attorneys; Anthony King

(57) ABSTRACT

The present invention includes a noise variance estimation circuit for wireless communication. An embodiment of the noise variance estimation circuit includes: a first estimation unit operable to generate a first estimation signal according to a reception signal and a reference signal in which the reception signal is derived from the equivalent of the reference signal; a first noise reduction unit operable to generate a first noise reduction signal by performing a first noise reduction process to the first estimation signal; a second estimation unit operable to generate a second estimation signal according to the difference between the first estimation signal and the first noise reduction signal; and a second noise reduction unit operable to execute a noise reduction adjustment according to the second estimation signal and perform a second noise reduction process to the first estimation signal in which the noise reduction adjustment affects the second noise reduction process.

20 Claims, 4 Drawing Sheets

(56) References Cited

U.S. PATENT DOCUMENTS

| | | | |
|---|---|---|---|
| 2003/0223355 A1* | 12/2003 | Pan | H04L 25/0224 370/210 |
| 2004/0071193 A1* | 4/2004 | Atarashi | H04B 1/7113 375/144 |
| 2004/0196891 A1* | 10/2004 | Tapaninen | H04B 1/707 375/148 |
| 2010/0254496 A1 | 10/2010 | Gau | |

* cited by examiner

NOISE VARIANCE ESTIMATION CIRCUIT AND METHOD FOR WIRELESS COMMUNICATION

BACKGROUND OF THE INVENTION

1. Field of the Invention

The present invention relates to a noise variance estimation circuit and method, especially to a noise variance estimation circuit and method applicable to wireless communication.

2. Description of Related Art

Regarding a general wireless communication system, after a transmission signal arrives at a receiver through a channel, the receiver will execute channel estimation to eliminate channel effect so as to improve the performance. FIG. 1 illustrates a conventional channel estimation device 100. As it is shown in FIG. 1, the channel estimation device 100 derives channel information from a reception signal with a Least Square (LS) algorithm estimation circuit 110, and then reduces noise influence with a Channel Smoothing Scheme (CSS) circuit 120. In consideration of that the CSS circuit 120 needs to adjust its coefficient(s) according to noise variance, a noise variance estimation circuit 130 of the channel estimation device 100 will calculate such noise variance by subtracting the output of the LS algorithm estimation circuit 110 from the output of the CSS circuit 120, and will provide the noise variance for the CSS circuit 120 to determine the coefficient(s).

In light of the above, the coefficient(s) determined by the CSS circuit 120 is/are correlated with the noise variance from the noise variance estimation circuit 130, and the noise variance estimation circuit 130 determines the noise variance in accordance with the output of the CSS circuit 120. As a result, the noise variance and the decision of the coefficient(s) will interact. Providing the predetermined value(s) of the coefficient(s) of the CSS circuit 120 do(es) not fit the current channel environment, which implies that at first the noise variance estimation circuit 130 receives an output of the CSS circuit 120 failing to reflect true conditions of the current channel environment, the noise variance estimation circuit 130 will output noise variance carrying non-negligible bias in the beginning and the CSS circuit 120 will adjust its coefficient(s) according to the noise variance carrying such non-negligible bias. This interaction leads to serious error propagation and degrades the accuracy of channel estimation greatly.

People who are interested in the related arts may refer to the following literatures: U.S. Pat. Nos. 8,379,773; 8,787,473; US patent publication of Pub. No. 20100254496; and Vega, Leonardo Rey, Rey, Hernan, "*A Rapid Introduction to Adaptive Filtering*", chapter 2 Wiener Filtering, ISBN 978-3-642-30299-2.

SUMMARY OF THE INVENTION

In consideration of the problems of the prior arts, an object of the present invention is to provide a wireless communication noise variance estimation circuit and method for making improvements over the prior arts.

The present invention discloses a noise variance estimation circuit for wireless communication. An embodiment of the estimation circuit comprises a first estimation unit, a first noise reduction unit, a second estimation unit and a second noise reduction unit. Said first estimation unit is configured to generate a first estimation signal according to a reception signal and a reference signal, in which the reception signal is derived from an equivalent of the reference signal. Said first noise reduction unit is configured to generate a first noise reduction signal by performing a first noise reduction process to the first estimation signal. Said second estimation unit is configured to generate a second estimation signal according to the difference between the first estimation signal and the first noise reduction signal. Said second noise reduction unit is configured to execute a noise reduction adjustment according to the second estimation signal, and configured to perform a second noise reduction process to the first estimation signal so as to generate a second noise reduction signal, in which the noise reduction adjustment affects the second noise reduction process.

The present invention further discloses a noise variance estimation method for wireless communication. An embodiment of the method comprises the following steps: generating a first estimation signal according to a reception signal and a reference signal, in which the reception signal is derived from an equivalent of the reference signal; generating a first noise reduction signal by performing a first noise reduction process to the first estimation signal; generating a second estimation signal according to the difference between the first estimation signal and the first noise reduction signal; and executing a noise reduction adjustment according to the second estimation signal and performing a second noise reduction process to the first estimation signal so as to generate a second noise reduction signal, in which the noise reduction adjustment affects the second noise reduction process.

These and other objectives of the present invention will no doubt become obvious to those of ordinary skill in the art after reading the following detailed description of the preferred embodiments that are illustrated in the various figures and drawings.

DETAILED DESCRIPTION OF THE PREFERRED EMBODIMENTS

Figure 1:
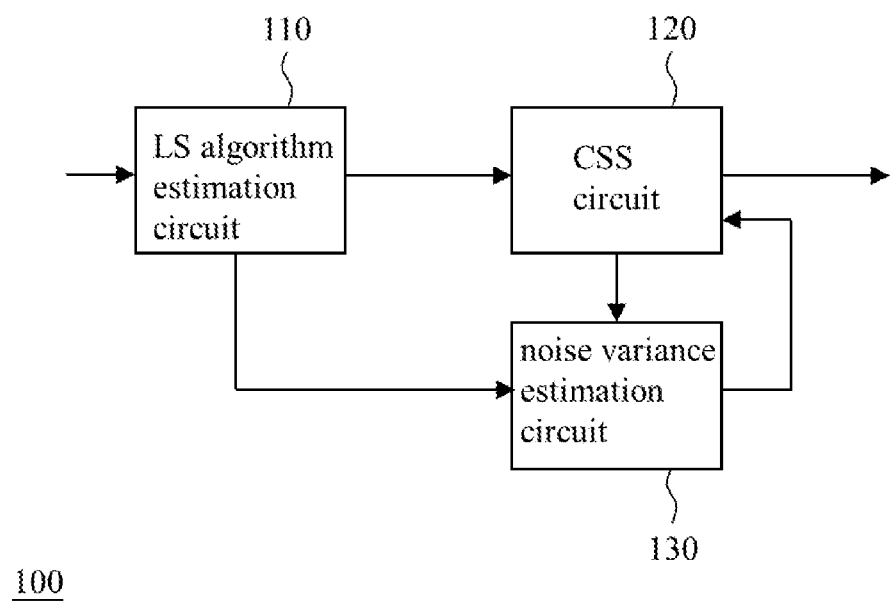
FIG. 1 illustrates a conventional channel estimation device.

The following description is written by referring to terms acknowledged in this industry field. If any term is defined in this specification, such term should be explained accordingly.

The present disclosure includes a noise variance estimation circuit and method applicable to wireless communication. On account of that some element itself of said estimation circuit could be known, the detail of such element will be omitted, provided that the written description and enablement requirements are fulfilled. Besides, the estimation method can be in the form of firmware and/or software which could be carried out by the estimation circuit of the present invention or the equivalent thereof. In addition, the estimation circuit and method are applicable to a variety of wireless communication systems including a Long Term Evolution (LTE) communication system. For ease of understanding, the following embodiments will be explained as they are applied to an LTE communication system.

For an LTE communication system, there are six types of channel bandwidth as follows: 1.4 MHz, 3 MHz, 5 MHz, 10 MHz, 15 MHz and 20 MHz. Taking 10 MHz channel bandwidth as an example, it has 1024 sub-carriers in which 600 sub-carries around the center of frequency carry data while the other sub-carries are treated as guard band. In the 600 sub-carries, every 12 adjacent sub-carriers constitute a resource block (RB), so that 600/12=50 resource blocks exist in 10 MHz bandwidth. An LTE communication system defines cell-specific reference signal (CRS) for downlink transmission. Regarding an LTE eNodeB having four antenna ports (i.e., antenna port 0, antenna port 1, antenna port 2 and antenna port 3), in the reception signals of antenna port 0 and antenna port 1, a sub-frame includes four orthogonal frequency division multiplexing (OFDM) symbols having CRS; in the reception signals of antenna port 2 and antenna port 3, a sub-frame includes two OFDM symbols having CRS. Providing an integral symbol has K sub-carries carrying CRS, K will be 12, 30, 50, 100 (that is to say an integral symbol having 100 sub-carries carrying CRS for 10 MHz bandwidth), 150 and 200 respectively for the aforementioned six types of channel bandwidth. Accordingly, the foresaid LTE receiver is operable to do channel and parameter estimation by using these given reference signals. The above-described background of an LTE communication system is known to people of skill in the art, and thus the detail is omitted.

Figure 2:
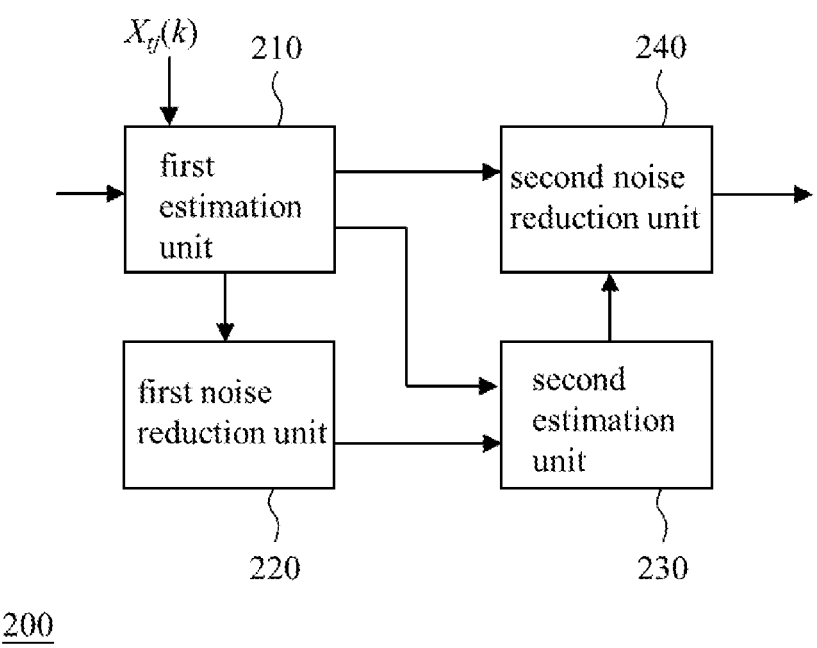
FIG. 2 illustrates an embodiment of the noise variance estimation circuit of the present invention.

Please refer to FIG. 2 which illustrates an embodiment of the noise variance estimation circuit of the present invention applicable to wireless communication. As shown in FIG. 2, the noise variance estimation circuit 200 includes a first estimation unit 210, a first noise reduction unit 220, a second estimation unit 230 and a second noise reduction unit 240. Said first estimation unit 210 (e.g., a known or self-developed Least Square (LS) algorithm estimation unit, or the equivalent thereof) is configured to generate a first estimation signal according to a reception signal and a reference signal, in which the reception signal is derived from an equivalent of the reference signal (e.g., derived from a reference signal of a transmitter) and an example of the reference signal is the aforementioned CRS. Said first noise reduction unit 220 (e.g., a known or self-developed channel smoothing filter, or the equivalent thereof) is coupled to the first estimation unit 210 and configured to generate a first noise reduction signal by performing a first noise reduction process to the first estimation signal. Said second estimation unit 230 (e.g., a known or self-developed noise variance estimator, or the equivalent thereof) is coupled to the first estimation unit 210 and the first noise reduction unit 220 and configured to generate a second estimation signal according to the difference between the first estimation signal and the first noise reduction signal. Said second noise reduction unit 240 (e.g., a known or self-developed channel smoothing filter, or the equivalent thereof) is coupled to the first estimation unit 210 and the second estimation unit 230, and is configured to execute a noise reduction adjustment according to the second estimation signal and perform a second noise reduction process to the first estimation signal so as to generate a second noise reduction signal, in which the noise reduction adjustment affects the second noise reduction process.

According to an exemplary implementation of the present embodiment, the first noise reduction unit 220 could be a Wiener filter operating according to a set of specific filter coefficients, so that the first noise reduction process itself is unaffected by the signal-to-noise ratio (SNR) of the current transmission environment and/or unaffected by the length of the current channel impulse response (CIR); the second noise reduction unit 240 could be a Wiener filter configured to carry out the noise reduction adjustment adaptively to adjust its own filter coefficient(s), in which the foresaid SNR of the current transmission environment and/or the length of the current CIR affect(s) the second noise reduction process. According to another exemplary implementation of the present embodiment, the first noise reduction unit 220 could be a Wiener filter operating according to a set of specific filter coefficients, so that a signal processing range (e.g., the range of amplitude behavior of the Wiener filter in time domain) of the first noise reduction process is predetermined or fixed. According to a further exemplary implementation of the present embodiment, the first noise reduction unit 220 could be a Wiener filter operating according to a set of specific filter coefficients; based on this set of specific filter coefficients, the signal processing range of the first noise reduction process depends on at least one of the following factors: the length of a cyclic prefix of a wireless communication system (e.g., an LTE communication system); and a maximum excess delay (e.g., 4680 nanosecond) of the wireless communication system. The length of the cyclic prefix and the maximum excess delay are well-defined (or prescribed) parameters, and include the length of CIR of a signal effectively, so that the first noise reduction unit 220 can preserve the CIR in time domain and eliminate some noise items accordingly.

The following description relates to the operation of an exemplary implementation of the noise variance estimation circuit 200. In this implementation, the noise variance estimation circuit 200 is applied to an LTE communication system, the first estimation unit 210 operates according to a known Least Square (LS) algorithm, each of the first and second noise reduction units 220, 240 includes a Wiener filter and operates according to a known Channel Smoothing Scheme (CSS), and the second estimation unit 230 operates according to a known noise variance estimation algorithm. It should be noted that the above setting is not a limitation to the scope of the present invention, and people of ordinary skill in the art can derive modifications of the present invention from the disclosure of this specification according to their own demand. In light of the above, regarding the reception signals received by the first estimation unit 210, in a sub-frame the reception signal $Y_{tij}(k)$ carried by the $k^{th}$ sub-carrier of the $t_{ij}$ symbol that carries CRS can be expressed by the following equation:

$$Y_{tij}(k)=H_{tij}(k)X_{tj}(k)+N_{tij}(k), k=1, \ldots, K, \qquad (1)$$

in which the variable i stands for the $i^{th}$ receiving antenna, the variable j stands for the $j^{th}$ transmitting antenna port, $H_{tij}(k)$ stands for the frequency response of a channel, $X_{tj}(k)$ stands for the CRS (that is known to the first estimation unit 210) transmitted by an LTE base station through the $j^{th}$ transmitting antenna port, $N_{tij}(k)$ stands for white Gaussian noise, and K has been defined in the preceding paragraph. Since $X_{tj}(k)$ is already known, the first estimation unit 210 can make use of an LS algorithm or the equivalent thereof to generate the first estimation signal as shown by the following equation:

$$\hat{H}_{LS,tij}(k)=H_{tij}(k)+N_{tij}(k)/X_{tj}(k) \qquad (2)$$

Based on the above description, in view of that the noise component of the first estimation signal $\hat{H}_{LS,tij}(k)$ is still significant, the first noise reduction unit 220 reduces the influence of noise through a Channel Smoothing Scheme. In this exemplary implementation, the first noise reduction unit 220 reduces the fluctuation of noise with a Wiener filter including a set of coefficient(s) $W^S=[w_1, \ldots, w_M]$ in which M is the order of the filter. After a process of Inverse Fast Fourier Transform (IFFT), $W^S$ can be expressed as follows: IFFT$[W^S]=T^S$. The CIR of channel information $\hat{H}^{LS,tij}(k)$ of equation (2) in time domain can be expressed as follows: $\hat{h}_{LS,tij}=h_{tij}+n_{tij}$, in which $h_{tij}$ is equal to $[h_{tij}(1), h_{tij}(2), \ldots, h_{tij}(L)]$, $n_{tij}$ is the noise item, and L is the length of CIR. Under the above setting, the first noise reduction unit 220 performs a smoothing process to $\hat{H}_{LS,tij}(k)$; in other words, the first noise reduction unit 220 performs a convolution operation to the channel information $\hat{H}_{LS,tij}(k)$ (k=1, ..., K) of equation (2) and the Wiener filter. This convolution operation achieves the effect of multiplying $\hat{h}_{LS,tij}$ by $T^S$ equivalently. When the order of the Wiener filter is an odd number, the result (i.e., the mathematical equation of the first noise reduction signal) of the said convolution operation can be expressed as follows:

$$\hat{H}_{smoothing,tij}(k) = \sum_{m=1}^{M} w_m \hat{H}_{LS,tij}\left(k - \frac{M+1}{2} + m\right), \quad (3\text{-}1)$$

in which k=(M+1)/2, ..., K–(M–1)/2. When the order of the Wiener filter is an even number, the mathematical equation of the first noise reduction signal can be expressed as follows:

$$\hat{H}_{smoothing,tij}(k) = \sum_{m=1}^{M} w_m \hat{H}_{LS,tij}\left(k - \frac{M+2}{2} + m\right), \quad (3\text{-}2)$$

in which k=(M+2)/2, K–(M–2)/2. In addition, since the reference signal at the band edge makes only one-sided contribution, the result of the smoothing process derived from this region is worse; therefore, the first noise reduction unit 220 may optionally select the results of the smoothing process derived from the non-band edge part of the channel and provide the selected results for the second estimation unit 230 to estimate noise variance. In other words, when the order of the Wiener filter is an odd number, the first noise reduction unit 220 may exclude the first noise reduction signal of k=1, ..., (M–1)/2 and exclude the first noise reduction signal of k=K–(M–3)/2, ..., K; when the order of the Wiener filter is an even number, the first noise reduction unit 220 may exclude the first noise reduction signal of k=1, ..., M/2 and exclude the first noise reduction signal of k=K–(M–4)/2, ..., K. For ease of understanding, the following description is based on the setting that the order of the Wiener filter is an odd number. Under such setting, if the reference signal at the band edge is excluded and equations (2) and (3-1) are taken into consideration, the mathematical equation $\hat{H}_{smoothing,tij}$ of the first noise reduction signal can be further expressed as follows:

$$\hat{H}_{smoothing,tij} = \sum_{k=\frac{M+1}{2}}^{K-\frac{M-1}{2}} H_{tij}(k) + a \sum_{k=\frac{M+1}{2}}^{K-\frac{M-1}{2}} \frac{N_{tij}(k)}{X_{tj}(k)}, \quad (4)$$

in which a stands for the ratio of residual noise and the value of a is a positive real number between 0 and 1.

Based on the above description, in this exemplary implementation, the second estimation unit 230 generates noise variance $\sigma^2_{new}$ (i.e., the second estimation signal) according to the first estimation signal of equation (2) and the first noise reduction signal of equation (4). The noise variance $\sigma^2_{new}$ can be expressed by the following equation:

$$\sigma^2_{new} = \frac{1}{N_T N_R} \sum_{i=1}^{N_R} \sum_{j=1}^{N_T} \frac{1}{T_j(K-M+1)} \quad (5)$$

$$\left[\frac{1}{(1-a)^2} \sum_{k=\frac{M+1}{2}}^{K-\frac{M-1}{2}} \left\| \hat{H}_{LS,tij}(k) - \hat{H}_{LS,tij}(k) \right\|^2 \right]$$

$$= \frac{1}{N_T N_R} \sum_{i=1}^{N_R} \sum_{j=1}^{N_T} \frac{1}{T_j(K-M+1)}$$

$$\left[\frac{1}{(1-a)^2} \sum_{k=\frac{M+1}{2}}^{K-\frac{M-1}{2}} \left\| H_{tij}(k) + \frac{N_{tij}(k)}{X_{tj}(k)} - \left(H_{tij}(k) + a\frac{N_{tij}(k)}{X_{tj}(k)}\right) \right\|^2 \right],$$

in which $N_T$ stands for the number of transmitting antenna port(s), $N_R$ stands for the number of receiving antenna(s), and $T_j$ stands for the number of symbol(s) with CRS in a sub-frame transmitted by the $j^{th}$ transmitting antenna port. After the generation of the second estimation signal, the second noise reduction unit 240 carries out the noise reduction adjustment according to the second estimation signal, and generates the second noise reduction signal by performing the second noise reduction process to the first estimation signal.

Based on the above description, in consideration of that an LTE system will transmit sub-frames continuously and the relative position of the reference signal at each sub-frame will not change by distinct sub-frames, the second estimation unit 230 may optionally use such characteristic to improve the accuracy of estimation. More specifically, the second estimation unit 230 may use both the noise variance (e.g., $\sigma^2_{new}$ in equation (5), which is equivalent to $\sigma^2_{new,Tsub}$ in equation (6)) estimated in accordance with the $T_{sub}$ sub-frame and the noise variance $\sigma^2_{avg,Tsub-1}$ estimated in accordance with the preceding ($T_{sub}-1$) sub-frame(s) to improve the accuracy of estimation. Accordingly, the mathematical equation of the second estimation signal can be expressed as follows:

$$\sigma^2_{avg,Tsub} = \frac{T_{sub}-1}{T_{sub}} \sigma^2_{avg,Tsub-1} + \frac{1}{T_{sub}} \sigma^2_{new,Tsub}, \quad (6)$$

in which $\sigma^2_{avg,0}=0$, $T_{sub}$ is the accumulated number of sub-frame(s), $(T_{sub}-1)/T_{sub}$ can be treated as a first weighting, and $1/T_{sub}$ can be treated a second weighting.

Based on the above description, $T_{sub}$ in equation (6) can be an arbitrary real number. In view of that the calculation of $(T_{sub}-1)/T_{sub}$ and $1/T_{sub}$ might be hard to be realized through a hardware circuit, the second estimation unit 230 may optionally select approximation values in substitution for $(T_{sub}-1)/T_{sub}$ and $1/T_{sub}$. For example, if the upper limit of $T_{sub}$ is $N=2^x$ (in which x is a positive integer), the following two equations could be used to approach equation (6):

$$\sigma^2_{avg,T_{sub}} = \frac{B_{min}}{N}\sigma^2_{avg,T_{sub}-1} + \frac{N-B_{min}}{N}\sigma^2_{new,T_{sub}} \quad (7)$$

$$B_{min} = \min_{B\in\square}\left(\frac{T_{sub}-1}{T_{sub}} - \frac{B}{N}\right)^2 + \left(\frac{1}{T_{sub}} - \frac{N-B}{N}\right)^2, \quad (8)$$

in which B is the positive integer capable of making the value of $[(T_{sub}-1/T_{sub})-(B/N)]^2+[(1/T_{sub})-(N-B/N)]^2$ minimum. For instance, providing $T_{sub}=4$ and $N=8$, B should be 6 to achieve $[(T_{sub}-1/T_{sub})-(B/N)]^2+[(1/T_{sub})-(N-B/N)]^2=0$. For another instance, providing $N=32$, $T_{sub}$ and the correlated $B_{min}$ are listed in Table 1, which indicates that the second estimation unit 230 is operable to search pre-stored data through a look-up table to obtain $B_{min}$; furthermore, if the second estimation unit 230 finds $T_{sub}$ greater than 32, the second estimation unit 230 can choose the $B_{min}$ in association with $T_{sub}=32$; in addition, $B_{min}/T_{sub}$ can be treated as a first approximation weighting and $(N-B_{min})/N$ can be treated as a second approximation weighting. Those of ordinary skill in the art can derive a lot of modifications (e.g., the expansion of Table 1, or the alteration of equation (7), equation (8), etc.) from the above disclosure, and such modifications pertain to the scope of the present invention.

TABLE 1

| $T_{sub}$ | $B_{min}$ |
|---|---|
| 1 | 0 |
| 2 | 16 |
| 3 | 21 |
| 4 | 24 |
| 5 | 26 |
| 6 | 27 |
| 7 | 27 |
| 8 | 28 |
| 9 | 28 |
| 10 | 29 |
| 11 | 29 |
| 12 | 29 |
| 13 | 30 |
| 14 | 30 |
| 15 | 30 |
| 16 | 30 |
| 17 | 30 |
| 18 | 30 |
| 19 | 30 |
| 20 | 30 |
| 21 | 30 |
| 22 | 31 |
| 23 | 31 |
| 24 | 31 |
| 25 | 31 |
| 26 | 31 |
| 27 | 31 |
| 28 | 31 |
| 29 | 31 |
| 30 | 31 |
| 31 | 31 |
| 32 | 31 |

Figure 3:
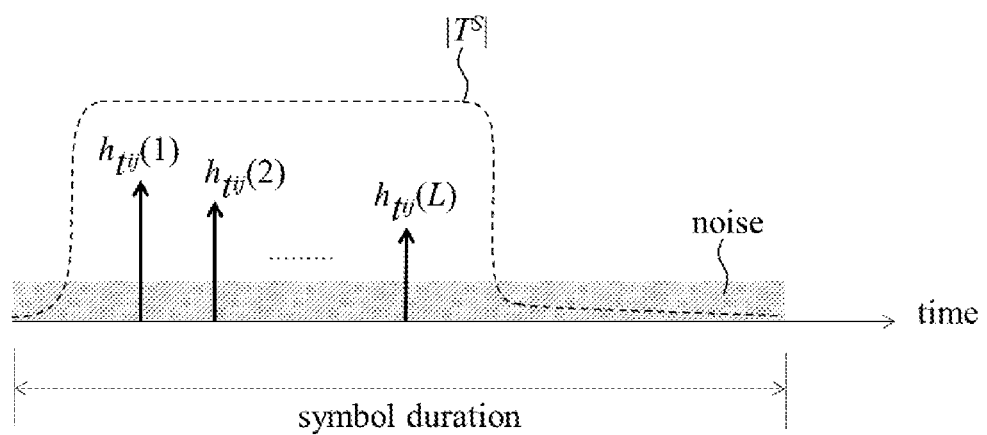
FIG. 3 illustrates an amplitude behavior diagram of the Wiener filter of the present invention in time domain.

Based on the above description, in this exemplary implementation, in order to estimate noise variance effectively, the first noise reduction unit 220 can adjust its Wiener filter's coefficient(s) or the coefficient(s) can be set properly in advance, so that the amplitude behavior $|T^S|$ ($T^S$=IFFT[$W^S$]) of the Wiener filter in time domain can approach a square wave and the filtering length can be longer than L (i.e., the length of CIR) as shown in FIG. 3. The abscissa of FIG. 3 stands for time, the ordinate of FIG. 3 stands for amplitude, $h_{tij}(.)$ stands for CIR as mentioned in the preceding paragraph, the oblique lines stand for noise, the amplitude behavior $|T^S|$ keeps most or all of CIR in a symbol duration and eliminates some noise within the symbol duration. The above-described manner is capable of keeping CIR in time domain and eliminating a part of noise items. The following description will further explain how to make the filtering length of a Wiener filter longer than L in time domain.

Provided that the $k^{th}$ sub-carrier carrying CRS is extracted through an LS algorithm, the signal can be expressed by the following equation:

$$\hat{H}_{k,LS}=H_k+N_k, \quad (a)$$

in which $H_k$ stands for a fading channel, $N_k$ stands for white Gaussian noise, and more explanation can be found in the following literature: Vega, Leonardo Rey, Rey, Hernan, "*A Rapid Introduction to Adaptive Filtering*", chapter 2 Wiener Filtering, ISBN 978-3-642-30299-2.

Afterwards, if the noise amount of equation (a) needs to be minimized, a Wiener filter can be a help to the reduction of noise fluctuation. If the coefficient(s) of the Wiener filter is/are W, in order to minimize the error of estimation, the concept of equation (2.12) in the above-identified literature (i.e., $E[e_{min}(n)\times(n)]=E\{[d(n)-w_{opt}^T x(n)]x(n)\}=0_{L\times1}$, in which E[.] stands for expectation operator, $e_{min}(n)$ stands for optimal error, $W_{opt}$ stands for optimal filter coefficient(s), d(n) is equivalent to $H_k$ of equation (a), and x(n) is equivalent to $\hat{H}_{k,LS}$ of equation (a)) can be introduced into the designated estimation environment to obtain the following equation:

$$E\{[H_k-W\hat{H}^*_{k,LS\_set}]\hat{H}_{k,LS\_set}\}=0, \quad (b)$$

in which the following equation (b-1) is true when the order of the Wiener filter is an odd number:

$$\hat{H}_{k,LS\_set} = \left[\hat{H}_{k-\frac{(M-1)}{2},LS} \ldots \hat{H}_{k,LS} \ldots \hat{H}_{k+\frac{(M-1)}{2},LS}\right], \quad (b\text{-}1)$$

and the following equation (b-2) is true when the order of the Wiener filter is an even number:

$$\hat{H}_{k,LS\_set} = \left[\hat{H}_{k-\frac{M}{2}+1,LS} \ldots \hat{H}_{k,LS} \ldots \hat{H}_{k+\frac{M}{2},LS}\right], \quad (b\text{-}2)$$

In equation (b), the superscript * stands for Hermitian operation.

After doing appropriate transposition to equation (b), the following equation is obtained:

$$E\{H_k\hat{H}_{k,LS\_set}\}=E\{W\hat{H}_{k,LS\_set}\hat{H}_{k,LS\_set}\} \quad (c)$$

If one would like to derive a set of W to sustain equation (c), such W can be expressed as follows:

$$W = \underbrace{E\{H_k\hat{H}_{k,LS\_set}\}}_{R_{XY}}\underbrace{\left[E\{\hat{H}^*_{k,LS\_set}\hat{H}_{k,LS\_set}\}\right]^{-1}}_{R_{YY}^{-1}} \quad (d)$$

Providing the order of the Wiener filter is an odd number, under a general condition, the correlation between a fading channel and Gaussian noise can be presumed being zero, and $R_{XY}$ in equation (d) can be expressed as follows:

$$R_{XY} = E\{H_k \hat{H}_{k,LS\_set}\} \quad (e)$$

$$= E\{H_k [\hat{H}_{k-\frac{(M-1)}{2},LS} \ldots \hat{H}_{k,LS} \ldots \hat{H}_{k+\frac{(M-1)}{2},LS}]\}$$

$$= E\{H_k [H_{k-\frac{(M-1)}{2},LS} + N_{k-\frac{(M-1)}{2}} \ldots H_{k,LS} +$$

$$N_k \ldots H_{k+\frac{(M-1)}{2},LS} + N_{k+\frac{(M-1)}{2}}]\}$$

$$= E\{H_k [H_{k-\frac{(M-1)}{2},LS} \ldots H_{k,LS} \ldots H_{k+\frac{(M-1)}{2},LS}]\}$$

$$= [R_{HH}(-\frac{(M-1)}{2}) \ldots R_{HH}(0) \ldots R_{HH}(\frac{(M-1)}{2})],$$

in which $R_{HH}$ stands for the autocorrelation function of the fading channel. Similarly, $R_{YY}$ can be expressed as follows:

$$R_{YY} = E\{\hat{H}^*_{k,LS\_set} \hat{H}_{k,LS\_set}\} \quad (f)$$

$$= \begin{bmatrix} R_{HH}(0) & R_{HH}(1) & R_{HH}(2) & \ldots & R_{HH}(M-1) \\ R'_{HH}(1) & R_{HH}(0) & R_{HH}(1) & \ddots & R_{HH}(M-2) \\ R'_{HH}(2) & R'_{HH}(1) & R_{HH}(0) & \ddots & \vdots \\ \vdots & \ddots & \ddots & \ddots & R_{HH}(1) \\ R'_{HH}(M-1) & \ldots & R'_{HH}(2) & R'_{HH}(1) & R_{HH}(0) \end{bmatrix} +$$

$$\sigma_n^2 I,$$

in which the superscript ' stands for conjugate operation, $\sigma_n^2$ stands for noise variance, and I stands for identity matrix. According to equation (e) and equation (f), two factors affect the coefficient(s) of the Wiener filter, i.e., the autocorrelation function of the fading channel, and the noise variance (or the value of SNR).

Based on the above description, the preceding paragraph mentions that the signal processing range of the first noise reduction process relates to at least one of the length of cyclic prefix and the maximum excess delay (e.g., the length of the signal processing range is equal to the length of cyclic prefix or equal to the maximum excess delay), and after the length of the signal processing range is set, the magnitude of the amplitude behavior $|T^S|$ (approximating a square wave) of the Wiener filter in time domain is set as well. Provided that the maximum excess delay of the square wave in time domain is $\tau_{max}$, the value of $R_{HH}$ can be expressed as follows:

$$R_{HH}(\Delta_f) = e^{-j\pi f \tau_{max}} \text{sinc}(\Delta_f \tau_{max}), \quad (g)$$

in which $\Delta_f$ is the interval between two adjacent reference signals in frequency domain. Therefore, $R_{HH}$ in equation (e) and equation (f) can be obtained through the adjustment of the value of $\tau_{max}$. The bigger the value of $\tau_{max}$, the greater the excess delay of the square wave.

The other important factor is noise variance, that is to say $\sigma_n^2$ in equation (f). Providing the value of $\sigma_n^2$ is higher (i.e., the value of SNR is lower in the environment), the amplitude ratio of the flat area of the foresaid square wave (as illustrated by FIG. 3) to the non-flat area of the square wave for noise reduction will be higher. Accordingly, the effect of noise reduction can be enhanced by the adjustment or setting of the coefficient(s) of the Wiener filter. On the other hand, providing the value of $\sigma_n^2$ is lower, the ratio of the flat area of the square wave to the non-flat area of the square wave can be set lower through the adjustment or setting of the coefficient(s) of the Wiener filter.

Based on the above description, since a feature of the present invention is to reserve the influence of channel and eliminate a part of noise, $\tau_{max}$ can be made greater through the setting of coefficient(s), so that the flat area of the square wave can be greater as well. As to $\sigma_n^2$ (which can be deemed the setting of SNR provided that the transmission power is 1), since the influence of channel is supposed to be reserved, the value of $\sigma_n^2$ can be made less (while the prescribed/presumed SNR value is higher) through the setting of coefficient(s), so as to restrict the non-flat area of the square wave and prevent the influence of channel from being eliminated.

It should be noted that the eduction of the aforementioned equation (a) to equation (g) is known in this industry field, and thus the details are omitted.

Figure 4:
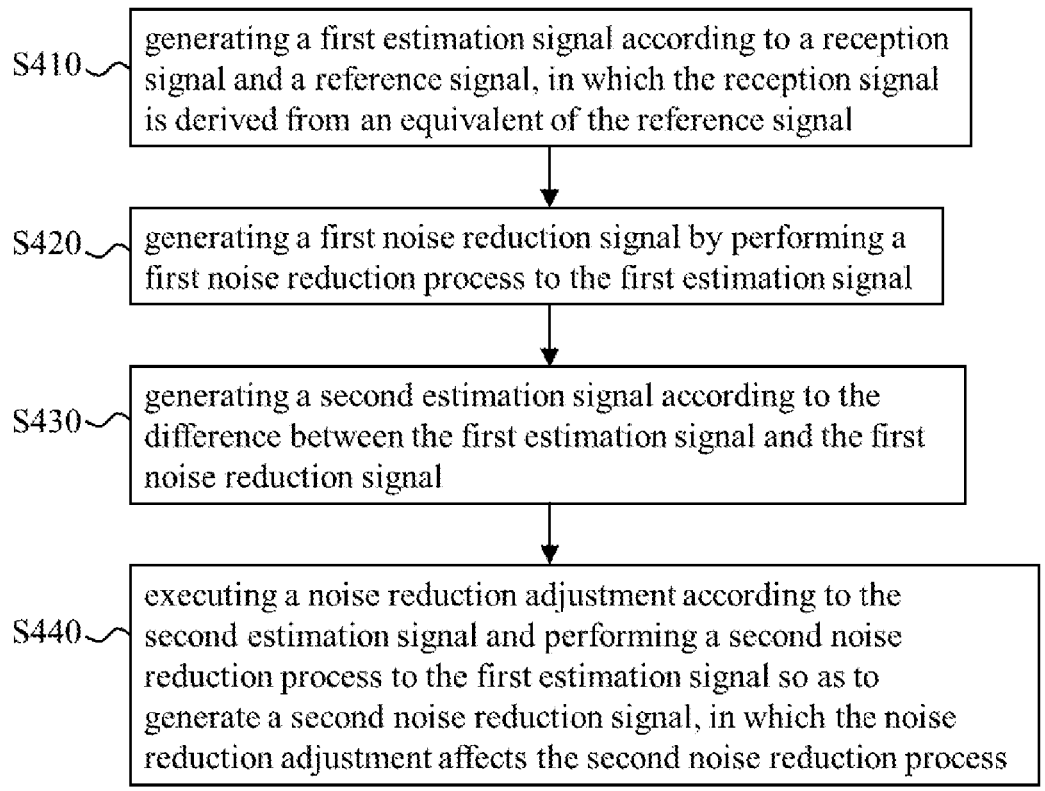
FIG. 4 illustrates an embodiment of the noise variance estimation method of the present invention.

In addition to the foresaid noise variance estimation circuit, the present invention also discloses a noise variance estimation method for wireless communication. An embodiment of the method is illustrated by FIG. 4, including the following steps:

Step S410: generating a first estimation signal according to a reception signal and a reference signal, in which the reception signal is derived from an equivalent of the reference signal;

Step S420: generating a first noise reduction signal by performing a first noise reduction process to the first estimation signal;

Step S430: generating a second estimation signal according to the difference between the first estimation signal and the first noise reduction signal; and Step S440: executing a noise reduction adjustment according to the second estimation signal and performing a second noise reduction process to the first estimation signal so as to generate a second noise reduction signal, in which the noise reduction adjustment affects the second noise reduction process.

Since those of ordinary skill in the art can appreciate the detail and modification of the method embodiment by referring to the disclosure of the aforementioned circuit embodiments, which means that the features of the aforementioned circuit embodiments can be applied to the method embodiment in a reasonable way, therefore repeated and redundant description is omitted provided that the written description and enablement requirements are still fulfilled.

In summary, the noise variance estimation circuit and method can prevent the bias caused by the interaction between parameters, and thereby can prevent the problem of error propagation and improve the accuracy of noise variance estimation.

The aforementioned descriptions represent merely the preferred embodiments of the present invention, without any intention to limit the scope of the present invention thereto. Various equivalent changes, alterations, or modifications based on the claims of present invention are all consequently viewed as being embraced by the scope of the present invention.

What is claimed is:

1. A noise variance estimation circuit for wireless communication, comprising:
   a first estimation unit configured to generate a first estimation signal according to a reception signal and a reference signal, in which the reception signal is derived from an equivalent of the reference signal;
   a first noise reduction unit configured to generate a first noise reduction signal by performing a first noise reduction process to the first estimation signal;

a second estimation unit configured to generate a second estimation signal according to the difference between the first estimation signal and the first noise reduction signal; and a second noise reduction unit configured to execute a noise reduction adjustment according to the second estimation signal, and configured to perform a second noise reduction process to the first estimation signal so as to generate a second noise reduction signal, in which the noise reduction adjustment affects the second noise reduction process.

2. The noise variance estimation circuit of claim 1, wherein the first estimation unit is configured to generate the first estimation signal according to a least square algorithm.

3. The noise variance estimation circuit of claim 1, wherein the first noise reduction unit is configured to perform the first noise reduction process according to a channel smoothing scheme, and the second noise reduction unit is configured to perform the second noise reduction process according to the same channel smoothing scheme or another channel smoothing scheme.

4. The noise variance estimation circuit of claim 1, wherein the first noise reduction unit is a Wiener filter.

5. The noise variance estimation circuit of claim 1, wherein the first noise reduction process is unaffected by a current signal-to-noise ratio (SNR) while the second noise reduction process is subject to the current SNR.

6. The noise variance estimation circuit of claim 1, wherein the first noise reduction process is unaffected by the length of a current channel impulse (CIR) response.

7. The noise variance estimation circuit of claim 1, wherein the first noise reduction process is unaffected by the second noise reduction signal.

8. The noise variance estimation circuit of claim 1, wherein a signal processing range of the first noise reduction process is fixed.

9. The noise variance estimation circuit of claim 1, wherein a signal processing range of the first noise reduction process depends on at least one of the following: the time length of a cyclic prefix of a wireless communication system; and a maximum excess delay.

10. The noise variance estimation circuit of claim 1, wherein the first noise reduction process excludes band edge components of the first estimation signal.

11. The noise variance estimation circuit of claim 1, wherein the difference between the first estimation signal and the first noise reduction signal includes a preceding difference and a current difference, the preceding difference is associated with a preceding sub-frame, the current difference is associated with a current sub-frame, and the second estimation unit processes the preceding difference according to a first weighting and processes the current difference according to a second weighting so as to generate the second estimation signal.

12. The noise variance estimation circuit of claim 1, wherein the difference between the first estimation signal and the first noise reduction signal includes a preceding difference and a current difference, the preceding difference is associated with a preceding sub-frame, the current difference is associated with a current sub-frame, and the second estimation unit processes the preceding difference according to a first approximate weighting and processes the current difference according to a second approximate weighting so as to generate the second estimation signal.

13. The noise variance estimation circuit of claim 12, wherein the second estimation unit obtains the first and second approximate weightings through a look-up table.

14. The noise variance estimation circuit of claim 1, wherein the second noise reduction unit is a Wiener filter and the noise reduction adjustment is executed to adjust the coefficient(s) of the Wiener filter.

15. The noise variance estimation circuit of claim 1, which is applied to a communication receiver of Long Term Evolution (LTE).

16. A noise variance estimation method for wireless communication, comprising:

generating a first estimation signal according to a reception signal and a reference signal, in which the reception signal is derived from an equivalent of the reference signal;

generating a first noise reduction signal by performing a first noise reduction process to the first estimation signal;

generating a second estimation signal according to the difference between the first estimation signal and the first noise reduction signal; and executing a noise reduction adjustment according to the second estimation signal and performing a second noise reduction process to the first estimation signal so as to generate a second noise reduction signal, in which the noise reduction adjustment affects the second noise reduction process.

17. The noise variance estimation method of claim 16, wherein the first noise reduction process is unaffected by a signal-to-noise ratio (SNR) while the second noise reduction process is subject to the SNR.

18. The noise variance estimation method of claim 16, wherein the first noise reduction process is unaffected by the second noise reduction signal.

19. The noise variance estimation method of claim 16, wherein the first estimation signal is generated according to a least square algorithm, the first noise reduction signal is generated according to a first channel smoothing scheme, the difference between the first estimation signal and the first noise reduction signal is obtained through subtraction calculation, and the second noise reduction signal is generated according to a second channel smoothing scheme.

20. The noise variance estimation method of claim 16, which is applied to a communication receiver of Long Term Evolution (LTE).

* * * * *